(12) United States Patent
Lo

(10) Patent No.: US 7,095,737 B2
(45) Date of Patent: Aug. 22, 2006

(54) VARIABLE LENGTH INTER-PACKET GAP

(75) Inventor: John M. Lo, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1036 days.

(21) Appl. No.: 10/087,056

(22) Filed: Feb. 28, 2002

(65) Prior Publication Data

US 2003/0161307 A1    Aug. 28, 2003

(51) Int. Cl.
 *H04L 12/28*    (2006.01)
(52) U.S. Cl. .................... 370/389; 370/445; 370/468
(58) Field of Classification Search ............... 370/445, 370/447, 468, 470, 504
See application file for complete search history.

(56) References Cited

U.S. PATENT DOCUMENTS 4,849,970 A * 7/1989 McCool .................... 370/517
5,404,353 A * 4/1995 Ben-Michael et al. ...... 370/235
5,982,778 A * 11/1999 Mangin et al. ............. 370/445
6,226,290 B1 * 5/2001 Salett et al. ................ 370/389

* cited by examiner

*Primary Examiner*—Chau Nguyen
*Assistant Examiner*—Christopher Grey
(74) *Attorney, Agent, or Firm*—Park, Vaughan & Fleming LLP

(57) ABSTRACT

A method and apparatus are provided for determining a suitable inter-packet gap (IPG), or a suitable extension to be added to a default IPG as a packet is processed. The apparatus includes an adder to add an incremental measure of a packet to an existing measure and produce a new measure (e.g., in bytes). The apparatus further includes a comparator which, if the new measure exceeds a programmable threshold (e.g., a stretch ratio), issues a signal to increase the IPG and decreases the new measure by the threshold. The current measure is then stored (e.g., in a register) for addition to the next incremental measure. A counter tracks the number of signals received before the end of the packet, at which time the total is forwarded to a component configured to insert or apply the IPG and the counter is reset for the next packet.

37 Claims, 3 Drawing Sheets

VARIABLE LENGTH INTER-PACKET GAP

BACKGROUND

This invention relates to the fields of computer systems and data communications. More particularly, an apparatus and method are provided for determining a suitable inter-packet gap, of variable length, based on the size of a packet.

One characteristic of packet-based communications is the delay between transmission of successive packets; this delay is commonly known as the inter-packet gap (IPG). Ethernet and other communication networks and protocols generally call for gaps of specific durations or lengths, which may be measured in bytes. For example, the standard delay between packets in Ethernet (as specified in IEEE standard 802.3ae) is twelve bytes. As long as the communication rates of the networks are within the expected range, the standard delay should be sufficient to allow switches, gateways, end stations and other entities to process the packets.

However, when packets cross network boundaries or are translated from one protocol or system to another, and particularly when different communication rates are encountered on either side of the boundary, an inter-packet gap applied on one side may be insufficient on the other. For example, when transferring packets from an Ethernet network operating at 10 gigabits/sec to an OC-192 SONET (Synchronous Optical Network) WAN (Wide Area Network) operating at approximately 9.45 gigabits/sec, the standard Ethernet IPG of twelve bytes may not leave sufficient time for an OC-192 entity (e.g., switch) to handle long packets.

SUMMARY

In one embodiment of the invention, an apparatus and methods are provided for facilitating inter-packet gaps (IPG) of variable size, based on the length of the preceding packet. In this embodiment, a programmable IPG extender, extension module or circuit is configured to determine the appropriate size of an IPG, or to augment an IPG of a default size. Illustratively, an IPG extender counts the number of bytes in a packet, and each time the byte count is found to exceed a programmable value or amount, the length of the IPG is increased by one element (e.g., one byte). Each time the IPG is increased, the byte count is decreased by the programmable amount.

In one embodiment of the invention, the IPG extension apparatus maintains a programmable threshold expressed as a number of bytes. An adder updates a byte count each time it receives a number of processed bytes (e.g., generated, coded, transmitted) for a packet. The updated byte count is compared to the programmable threshold by a comparison module. If the updated count exceeds the threshold, the comparison module issues a signal to an extension counter to increase its count of IPG elements to insert after the packet, and decreases the updated byte count by the threshold. The new or updated count is stored (e.g., in a register) for combination with the next incremental byte measure.

The count of IPG elements to insert, which is assembled by an IPG extension counter, is signaled to an IPG countdown timer or other element (e.g., MAC transmitter) that applies or enforces inter-packet gaps. The count may comprise the total number of elements (e.g., bytes) of the IPG, or may comprise a number to be added to a default value before being received and/or applied by the countdown timer.

DETAILED DESCRIPTION

Figure 1:
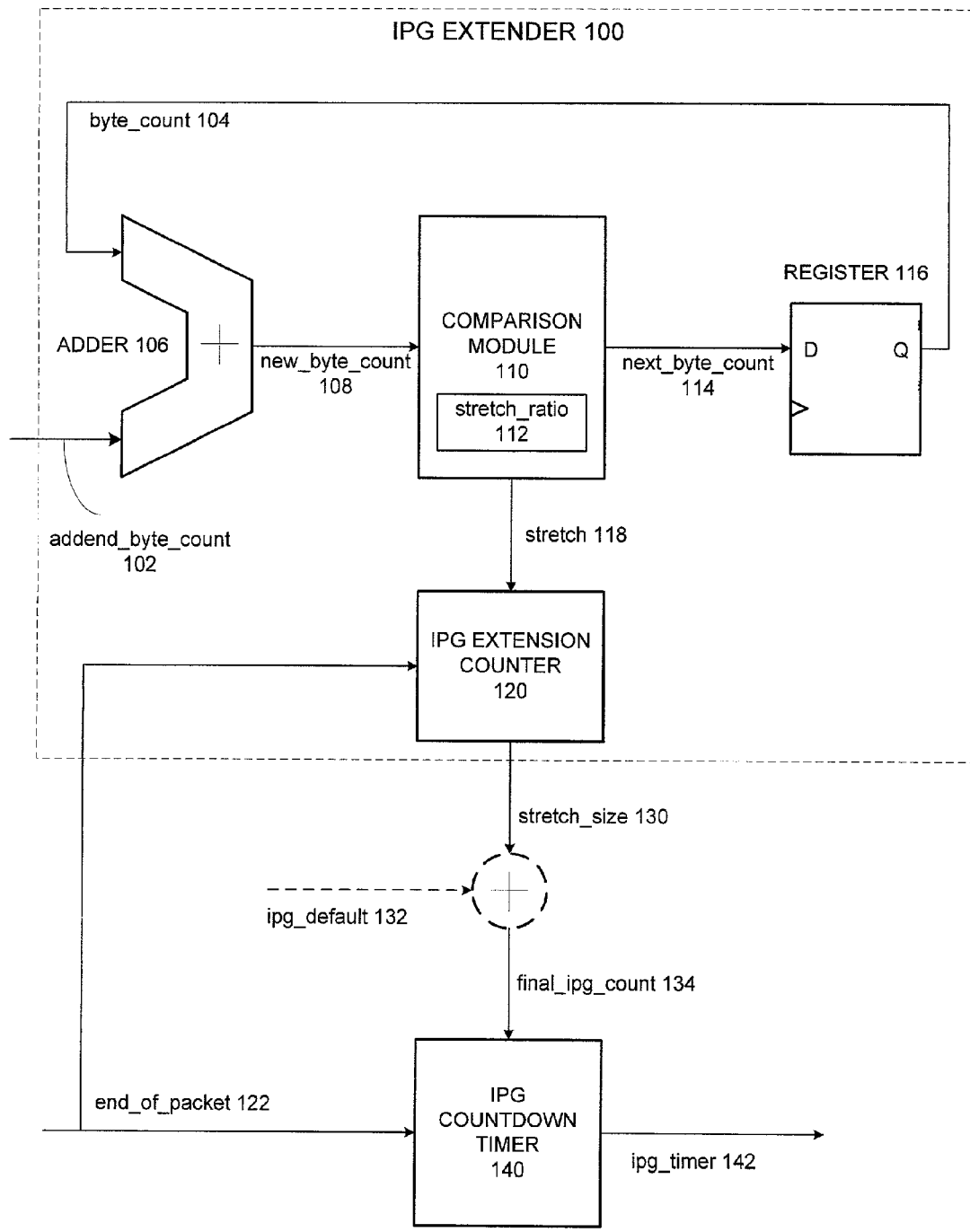
FIG. 1 is a block diagram depicting an IPG extender for determining a suitable size of an extended inter-packet gap, according to one embodiment of the present invention.

The following description is presented to enable any person skilled in the art to make and use the invention, and is provided in the context of particular applications of the invention and their requirements. Various modifications to the disclosed embodiments may be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

The program environment in which a present embodiment of the invention is executed illustratively incorporates a general-purpose computer or a special purpose device such as a hand-held computer. Details of such devices (e.g., processor, memory, data storage, display, communication ports) may be omitted for the sake of clarity.

It should also be understood that the techniques of the present invention may be implemented using a variety of technologies. For example, the methods described herein may be implemented in hardware utilizing either a combination of microprocessors, specially designed application specific integrated circuits, programmable logic devices, other elements, or various combinations thereof.

In one embodiment of the invention, an apparatus is provided for determining a suitable inter-packet gap (IPG), or an extension to an initial or default IPG.

In this embodiment, the apparatus maintains a measure of the size of a packet (e.g., in bytes), which is incremented as portions of the packet are assembled, coded, transmitted or otherwise processed. The packet measure may be incremented, in this embodiment, for every byte of a packet (e.g., between start-of-packet and end-of-packet delimiters) or for any desired portion of a packet. The measure is dynamically compared to a threshold value and, if the measure exceeds the threshold, a count of the number of elements (e.g., bytes) to include in an IPG is incremented. The measure of the size of the packet may then be decreased by the amount of the threshold, and the new measure stored for subsequent updating with the size of the next portion of the packet.

The value held by the IPG counter when the end of the packet is detected is used to generate or augment an IPG to be applied after transmission of the packet and before transmission of a subsequent packet.

Illustratively, the length or duration of the IPG may be calculated in direct proportion to the counter value. For example, the counter value may be applied as a measure of the number of bytes of IPG to delay after the packet. As one alternative, the counter value may be added to a default IPG value (e.g., twelve bytes for Ethernet networks). In this alternative embodiment, the sum of the counter and default IPG values may represent the total number of bytes of IPG to be applied.

In an embodiment of the invention, the counter value (or the sum of the counter value and a default value) is provided to an IPG timer. Illustratively, the IPG timer is configured to decrement from its input value to zero (or increment from zero to the input value) and delay transmission of the subsequent packet by one byte each time it decrements by one.

One suitable use for the apparatus is within a communication entity (e.g., switch, gateway, bridge) that transfers packets from a first communication environment operating at a first data rate to a second environment operating at a second data rate. The apparatus allows the communication entity to adjust the output data rate (e.g., when transferring from a faster environment to a slower one) by asserting longer inter-packet gaps.

In one embodiment of the invention, the threshold value against which the dynamic packet measure is compared is programmable. This threshold value may be termed a "stretch ratio." Illustratively, when an apparatus according to this embodiment is employed between a 10 Gbit/sec Ethernet environment and an OC-192 Synchronous Optical Network (SONET) environment operating at approximately 9.45 Gbit/sec, suitable stretch ratios are between 12 and 64. The programmable stretch ratio may be set by a network administrator, or may be automatically adjusted in response to measurements or observations made by the communication entity in which the apparatus is installed. For example, if a downstream entity cannot process packets at one data rate, the stretch ratio may be reprogrammed to a higher value to increase the IPG and decrease the data rate.

FIG. 1 depicts inter-packet gap (IPG) extender 100 according to one embodiment of the invention. An IPG extender may be alternatively described using other terms, such as an IPG configuration or extension module, etc. In this embodiment, IPG extender 100 facilitates the determination of a number of IPG elements (e.g., bytes) to be interposed after the transmission of one packet and before the transmission of another.

IPG extender 100 of FIG. 1 comprises adder 106, comparison module 110, register 116 and IPG extension counter 120. In alternative embodiments, an IPG extender may be configured differently. For example, multiple features or elements depicted in FIG. 1 may be combined, or other elements or features described herein may be included. For example, FIGS. 2A–B, which are described below, provide further details of illustrative embodiments of a comparison module and an IPG extension counter.

In the illustrated embodiment, adder 106 receives addend_byte_count 102 from a physical layer (PHY) element, a medium access control (MAC) transmitter, or other element that generates, codes, transmits or otherwise processes portions of a packet. Illustratively, addend_byte_count 102 comprises an incremental number of bytes detected or processed in a current packet. For example, each time one or more bytes are processed, addend_byte_count 102 may be issued to provide the number of bytes to adder 106. In this embodiment, IPG extender 100 is configured to measure the size of a packet in individual bytes; in other embodiments, other units of measure may be used (e.g., words, other multi-byte units).

Adder 106 also receives byte_count 104 to add to addend_byte_count 102 to produce or generate new_byte_count 108. Byte_count 104 represents a measure of the number of bytes previously counted, and new_byte_count 108 represents an updated or new measure comprising the sum of byte_count 104 and addend_byte_count 102.

New_byte_count 108 is received by comparison module 110, which stores or includes stretch_ratio 112. In this embodiment, stretch_ratio 112 comprises a threshold measure of bytes; each time new_byte_count 108 reaches or exceeds stretch_ratio 112, the IPG extender adds another IPG element (e.g., a byte of IPG or inter-packet delay) to its count. In particular, comparison module 110 generates stretch signal 118 to IPG extension counter 120 when stretch_ratio 112 is exceeded. IPG extension counter 120 increments each time it receives stretch signal 118.

Comparison module 110 may comprise memory in which to store stretch_ratio 112 and/or a comparator configured to perform the comparison between new_byte_count 108 and stretch_ratio 112. Alternatively, IPG extender 100 may include a comparator separate from comparison module 110. When comparison module 110 issues stretch 118, it also decreases the new_byte_count by an amount equal to stretch_ratio 112.

As discussed above, stretch_ratio 112 may be a programmable value. Thus, the stretch_ratio may be set or adjusted according to the operating environment(s) of the communication entity in which IPG extender 100 is installed. Illustratively, as the operational data rate of the environment (e.g., network or other communication link) onto which packets (and IPG) are injected increases, stretch_ratio 112 may decrease. Conversely, as the data rate of the output environment decreases, stretch_ratio 112 may increase. A stretch_ratio of approximately 12 to 64 may be suitable for an environment in which packets are transferred from a 10 Gbit/sec communication link to a communication link operating at approximately 9.45 Gbit/sec.

Comparison module 110 feeds next_byte_count 114 to register 116. As described above, next_byte_count 114 may be equivalent to new_byte_count 108 or may result from the subtraction of stretch_ratio 112 from new_byte_count 108. Illustratively, next_byte_count 114 is stored in register 116 and provided to adder 106 as byte_count 104 to be added to the next addend_byte_count. In alternative embodiments of the invention, a storage element other than a register may be employed to store a byte count, such as a set of flip-flops, latches, etc.

In the embodiment of FIG. 1, the width of each signal passing between any or all of adder 106, comparison module 110, register 116 and counter 120 may be five bits, eight bits, or some other suitable size. Accordingly, register 116 may comprise a 5-bit, 8-bit or other size register. In this embodiment of the invention, stretch_ratio 112 may be set to a value ranging from 0 to 255. In other embodiments, other signal dimensions may be employed, with the various elements of the IPG extender being configured accordingly.

In addition to stretch 118, in the embodiment of FIG. 1 IPG extension counter 120 also receives end_of_packet signal 122. This signal may also be provided to IPG countdown timer 140, as described below. End_of_packet 122 indicates that the current packet has been completed (e.g., generated, coded, transmitted). Therefore, IPG extension counter 120 signals its value as stretch size 130 and resets itself to zero to begin configuring an IPG (or IPG extension) for the next packet.

In the embodiment of FIG. 1, stretch_size 130 may comprise a measure of IPG elements to be added to a default IPG size represented by ipg_default 132, which may be static, dynamic or programmable. Illustratively, the combination of these two values is provided to an IPG countdown timer 140 as final_ipg_count 134. The IPG countdown timer, or other appropriate component of the communication entity, causes the next packet to be delayed according to the final_ipg_count. In particular, the IPG countdown timer may decrement from final_ipg_count 134 to zero and, for each unit decremented, one IPG element (e.g., byte) may be applied. End_of_packet 122 may serve as a trigger to the countdown timer to initiate its countdown.

Illustratively, IPG countdown timer 140 may provide its countdown signal to a MAC transmitter as ipg_timer 142. For example, the output of the IPG countdown timer may serve as input to a transmission module or process that alternates between two states (and/or others). In particular, such a module or process may operate in a "transmission enabled" state during the generation, coding, transmission or other processing of the current packet, then switch to a "wait" state when an end of packet is signaled (e.g., end_of_packet 122). It remains in this state as the timer counts down and returns to the "transmission enabled" state, and may begin a subsequent packet, when the timer expires (e.g., when ipg_timer 142 reaches zero). IPG countdown timer 140 may, alternatively, increment (e.g., from zero to final_ipg_count 134) rather than decrement.

In one alternative embodiment of the invention, IPG extension counter 120 may provide its stretch_size signal directly to the IPG countdown timer (or equivalent component). Thus, the measure of IPG elements signaled by IPG extension counter 120 may comprise the total measure of IPG elements to be interposed after a packet. In this alternative embodiment, counter 120 may, when reset, take on a default value of zero or some other suitable value (e.g., twelve for an Ethernet network environment).

In another alternative embodiment, the output of IPG extension counter 120 (i.e., stretch_size 130) may be expressed in units other than single IPG elements or bytes. For example, counter 120 may signal in increments of eight bytes or some other suitable value.

The embodiment depicted in FIG. 1 may be implemented within a single integrated circuit, module or board of a communication entity (e.g., switch, gateway, computer).

Figure 2A:
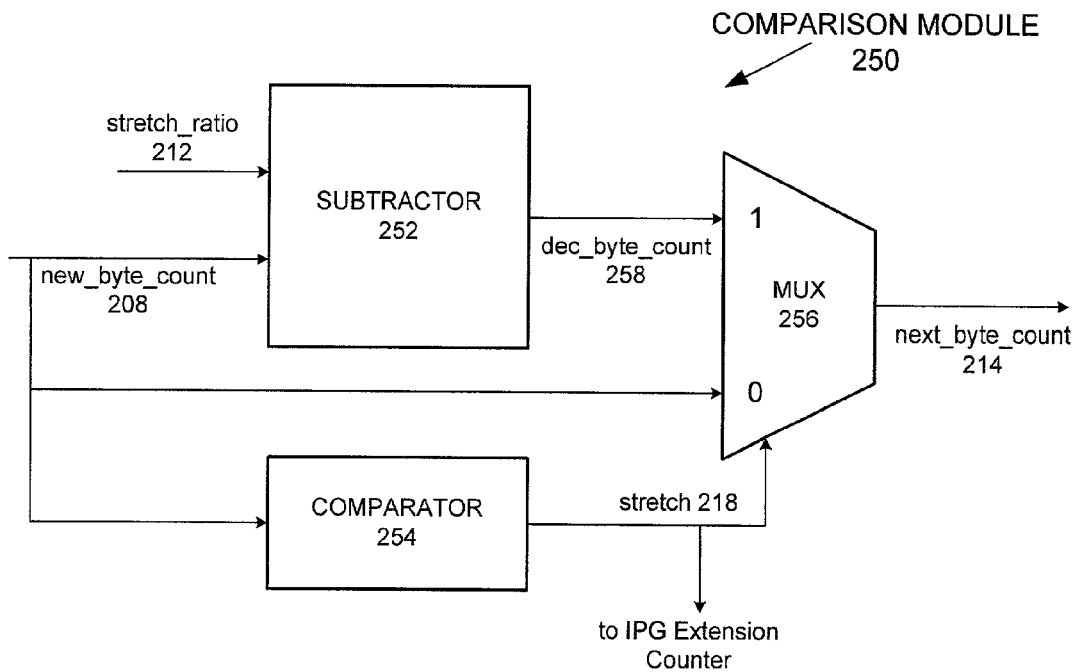
FIG. 2A depicts an illustrative comparison module for use with an IPG extender, according to one embodiment of the invention.

FIG. 2A demonstrates one embodiment of a comparison module for use in an IPG extender such as IPG extender 100 of FIG. 1. In the illustrated embodiment, comparison module 250 includes subtractor 252, comparator 254 and mux 256. Subtractor 252 receives new_byte_count 208, which corresponds to new_byte_count 108 of FIG. 1, and also receives (or maintains) stretch_ratio 212. If new_byte_count 208 exceeds stretch_ratio 212, subtractor 252 subtracts the stretch ratio value from new_byte_count 208 and signals the result to mux 256 as dec_byte_count 258.

Comparator 254 compares new_byte_count 208 to the stretch ratio value. Therefore, the comparator also receives or stores stretch_ratio 212. When new_byte_count 208 exceeds stretch_ratio 212, comparator raises stretch 218, which is carried to mux 256 and the IPG extension counter (e.g., counter 120 of FIG. 1).

Mux 256 uses stretch 218 as a control signal to pass either new_byte_count 208 or dec_byte_count 258. The output of mux 256 is next_byte_count 214, which corresponds to next_byte_count 114 of FIG. 1.

Figure 2B:
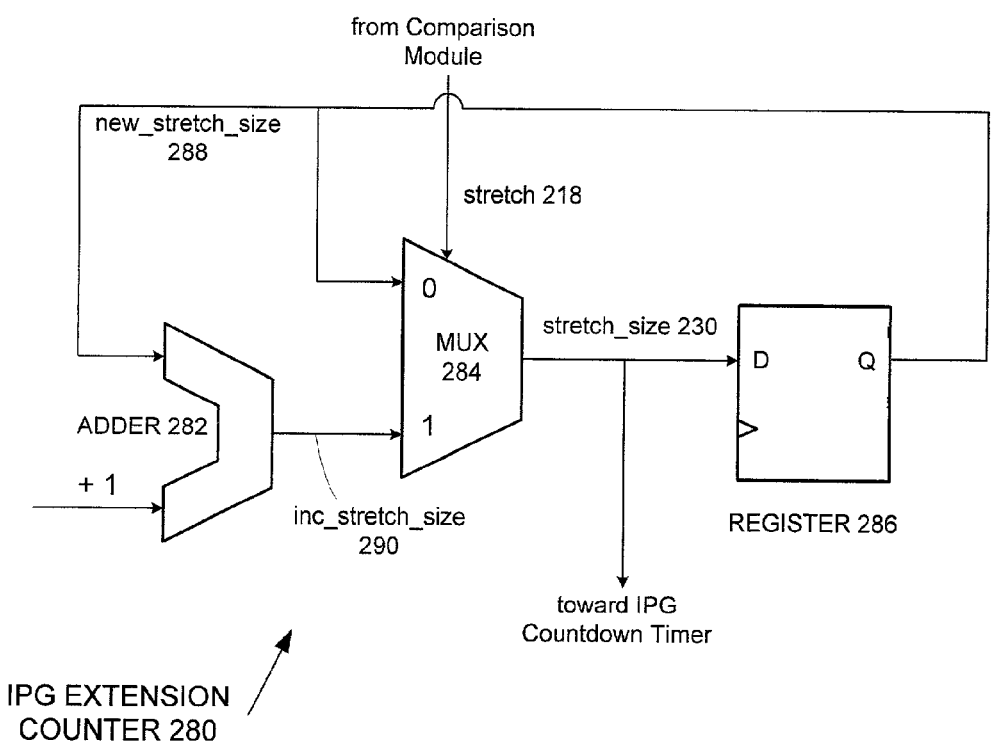
FIG. 2B depicts an illustrative IPG extension counter for use with an IPG extender, according to one embodiment of the invention.

FIG. 2B demonstrates one embodiment of a IPG extension counter for use in an IPG extender such as IPG extender 100 of FIG. 1. In this embodiment, IPG extension counter 280 comprises adder 282, mux 284 and register (or other storage) 286.

Illustratively, adder 282 receives new_stretch_size 288 from register 286, which represents a current IPG size or extension as accrued by the IPG extension counter. Adder 282 also receives an incremental signal which, when added to new_stretch_size 288, increments the stretch size by one. This is signaled as inc_stretch_size 290.

Mux 284 uses stretch signal 218 (received from a comparison module) as a control to select either new_stretch_size 288 or inc_stretch_size 290. The selected signal is issued as stretch_size 230 to register 286 and is also propagated toward an IPG countdown timer (e.g., such as timer 140 of FIG. 1).

Figure 3:
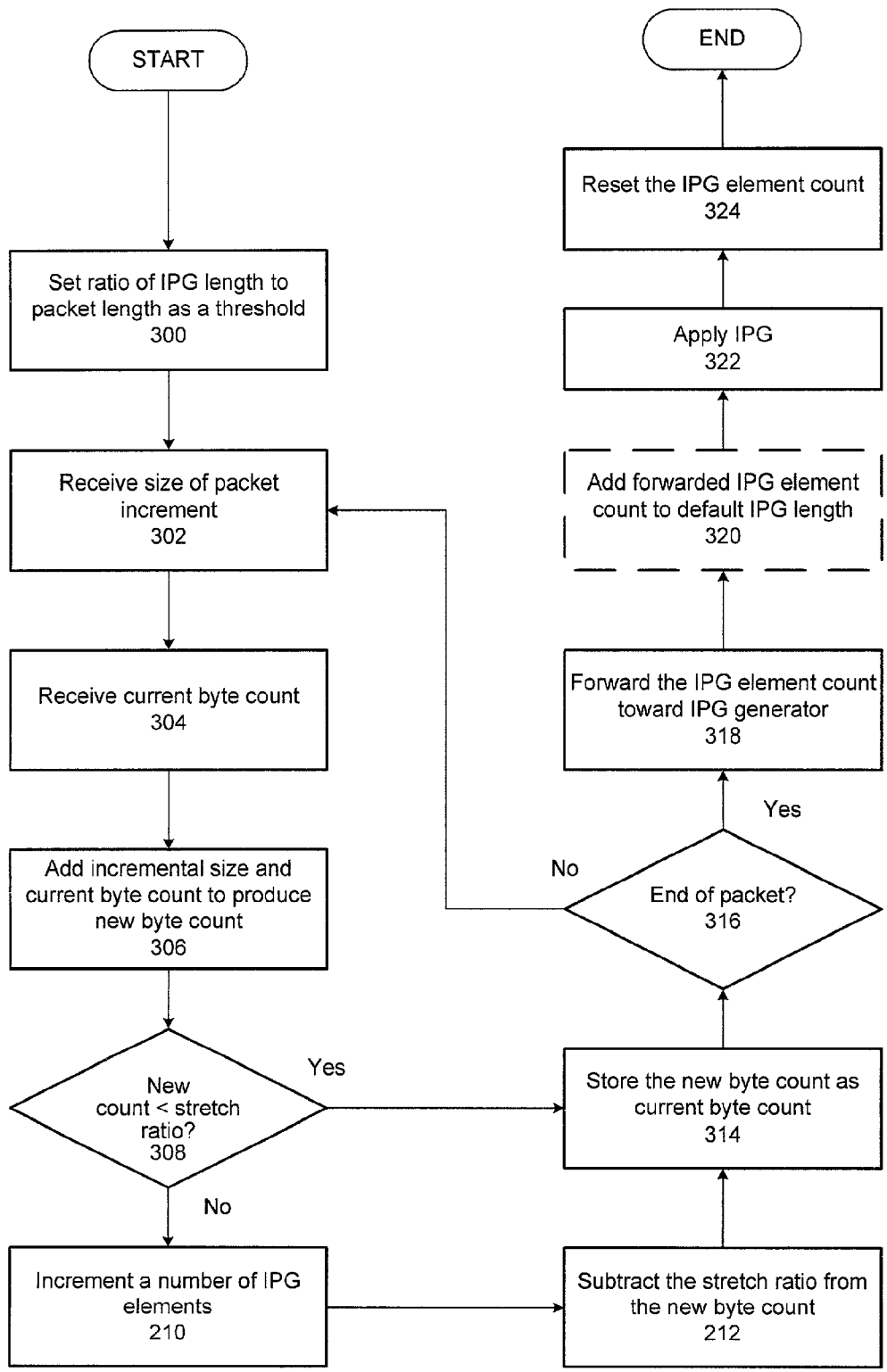
FIG. 3 is a flowchart demonstrating one method of configuring an inter-packet gap, according to one embodiment of the invention.

FIG. 3 depicts one method of determining an IPG length, or a suitable extension to a default length of an IPG, according to one embodiment of the invention. In this embodiment, the determination is made while a packet is transmitted or processed for transmission, to determine the length of the IPG to follow that packet. Other suitable methods may be derived from the following discussion.

In state 300 a threshold representing the ratio of IPG elements (e.g., bytes) to packet size (e.g., in bytes) is set. Illustratively, this ratio (which may be termed the stretch ratio) is expressed as a number of bytes, and may be programmable or fixed. As described above, for a ratio X, one IPG element will be added to the IPG for every X bytes in the packet.

In state 302, the size of an incremental portion of a packet, or the entire packet, is received. Illustratively, the size is received in bytes, and may be of any number from one up to the number of bytes in the entire packet.

In state 304 a current byte count is received or retrieved from storage and, in state 306, the incremental size of the packet is added to the current byte count to produce a new or updated byte count.

In state 308 the new byte count is compared to the stretch ratio. If the new count is less than the ratio the method proceeds to state 314.

Otherwise, in state 310 a number of IPG elements to be applied after the packet is incremented. Then, in state 312 the new byte count is decreased by the threshold amount (the value of the stretch ratio).

In state 314 the new byte count is stored for retrieval as the current byte count when the next incremental packet measure is received.

In state 316, if the end of the packet has been detected the method returns to state 302; otherwise the method continues at state 318.

In state 318 the number of IPG elements tallied before the end of packet is forwarded toward an IPG generator (i.e., a module or component that applies an IPG after a packet).

In optional state 320, the forwarded number of IPG elements may be added to a default IPG length or size. If state 320 is carried out, then the number of IPG elements added during processing of the packet will serve as an extension to the default IPG.

In state 322 the IPG is applied to delay transmission of a subsequent packet.

In state 324 the counter of IPG elements is reset to an initial value (e.g., zero or a default value).

The foregoing descriptions of embodiments of the invention have been presented for purposes of illustration and description only. They are not intended to be exhaustive or to limit the invention to the forms disclosed. Accordingly, the above disclosure is not intended to limit the invention; the scope of the invention is defined by the appended claims.

What is claimed is:

1. An inter-packet gap configuration module for determining, as a packet is transmitted, a suitable inter-packet gap to be applied after the packet, comprising:
addition means for adding a partial measure of the size of a packet and a previous measure to produce a new measure;
signal means for generating a signal if said new measure equals or exceeds a threshold; and
storage means for storing said new measure.

2. The inter-packet gap configuration module of claim 1, further comprising:
counting means configured to track the sum of said signals generated by said signal means before transmission of the packet is completed.

3. The inter-packet gap configuration module of claim 2, wherein the size of the inter-packet gap to be applied after the packet is directly proportional to said sum.

4. The inter-packet gap configuration module of claim 2, wherein the size, in bytes, of the inter-packet gap to be applied after the packet is equal to said sum.

5. The inter-packet gap configuration module of claim 2, wherein the size, in bytes, of the inter-packet gap to applied after the packet is equal to said sum plus a default value.

6. The inter-packet gap configuration module of claim 2, wherein said sum is provided to an inter-packet countdown timer configured to insert a number of inter-packet gap elements, after the packet, greater than or equal to said sum.

7. The inter-packet gap configuration module of claim 1, further comprising:
comparison means for comparing said new measure with said threshold.

8. The inter-packet gap configuration module of claim 1, further comprising:
subtraction means for subtracting said threshold from said new measure if said new measure exceeds said threshold.

9. The inter-packet gap configuration module of claim 8, wherein said subtraction means comprises one or more of:
said signal means; and
a comparison means for comparing said new measure with said threshold.

10. The inter-packet gap configuration module of claim 1, wherein said storage means provides said stored new measure as said previous measure to said addition means when a subsequent partial measure of a packet is received at said addition means.

11. The inter-packet gap configuration module of claim 1, wherein said threshold is programmable.

12. A programmable inter-packet gap (IPG) configuration module for calculating a number of inter-packet gap elements to apply after a packet, comprising:
an adder configured to generate a new count of packet units by adding:
a previous count of packet units; and
an additional count of packet units;
a comparator configured to compare said new count to a threshold;
a signaller configured to generate an IPG extension signal if said new count is greater than said threshold;
a subtractor configured to subtract said threshold from said new count if said new count is greater than said threshold; and
a storage element configured to store said new count.

13. The programmable inter-packet gap (IPG) configuration module of claim 12, further comprising:
a counter configured to calculate the sum of said IPG extension signals generated by said signaller;
wherein a number of IPG elements to be interposed between the packet and a subsequent packet is derived from said sum.

14. The programmable inter-packet gap (IPG) configuration module of claim 13, wherein said sum is forwarded to an IPG timer configured to enable transmission of said subsequent packet after said number of IPG elements are applied.

15. The programmable inter-packet gap (IPG) configuration module of claim 12, wherein said storage element is further configured to provide said stored new count to said adder as said previous count of packet units for addition to a next additional count of packet units.

16. The programmable inter-packet gap (IPG) configuration module of claim 12, wherein said comparator comprises said subtractor.

17. The programmable inter-packet gap (IPG) configuration module of claim 12, wherein said comparator comprises said signaller.

18. The programmable inter-packet gap (IPG) configuration module of claim 12, wherein said IPG elements and said packet units are measured in bytes.

19. An apparatus for calculating an inter-packet gap extension based on a size of a packet, comprising:
an adder configured to add a current byte count and an incremental byte count to produce a new byte count, wherein said incremental byte count comprises a number of bytes processed in a packet as the packet is transmitted;
a storage component configured to store said new byte count;
a comparator configured to generate an inter-packet gap extension signal if said new byte count exceeds a threshold; and
a counter configured to sum said inter-packet gap extension signals to determine an inter-packet gap extension.

20. The apparatus of claim 19, wherein said inter-packet gap extension is provided to an inter-packet gap generator configured to apply an inter-packet gap after transmission of the packet.

21. The apparatus of claim 20, wherein the inter-packet gap applied by the inter-packet gap generator is measured in bytes and is greater than or equal to said inter-packet gap extension.

22. The apparatus of claim 19, further comprising:
a default inter-packet gap value;
wherein the sum of said inter-packet gap extension and said default inter-packet gap value is provided to an inter-packet gap generator configured to apply an inter-packet gap after transmission of the packet.

23. The apparatus of claim 19, further comprising:
a subtractor configured to decrease said new byte count by said threshold prior to storage of said new byte count in said storage element if said new byte count exceeds said threshold.

24. The apparatus of claim 23, wherein said comparator comprises said subtractor.

25. The apparatus of claim 19, wherein said stored new byte count is received at said adder as said current byte count when a subsequent incremental byte count is received at said adder.

26. An inter-packet gap (IPG) extender, comprising:
an adder module configured to add a current measure of a packet size and an incremental measure of the packet to produce an incremented measure;

a comparison module configured to receive said incremented measure, comprising:
a comparator configured to issue an extension signal if said incremented measure is greater than a threshold value;
a subtractor configured to decrement said incremented measure by said threshold to produce a decremented measure; and
a first multiplexer configured to issue one of said incremented measure and said decremented measure as a new measure;
a first storage configured to store said new measure; and
an extension counter configured to receive said extension signal, comprising:
an adder configured to add a current IPG extension and an incremental IPG extension to produce an incremented IPG extension;
a second multiplexer configured to issue one of said current IPG extension and said incremented IPG extension as a new IPG extension; and
a second storage configured to store said new IPG extension.

27. The IPG extender of claim 26, wherein said first storage is further configured to produce said stored new measure as said current measure.

28. The IPG extender of claim 26, wherein said second storage is further configured to produce said stored new IPG extension as said current IPG extension.

29. The IPG extender of claim 26, wherein said first multiplexer is configured to:
issue said incremented measure as said new measure if said incremented measure is not greater than said threshold value; and
issue said decremented measure as said new measure if said incremented measure is greater than said threshold value.

30. The IPG extender of claim 26, wherein said first multiplexer is configured to:
issue said decremented measure as said new measure if said comparator issues said extension signal; and
issue said incremented measure as said new measure otherwise.

31. The IPG extender of claim 26, wherein said second multiplexer is configured to:
issue said incremented IPG extension as said new IPG extension if said extension counter receives said extension signal; and
issue said current IPG extension as said new IPG extension otherwise.

32. A method of configuring an inter-packet gap (IPG) to be applied after a packet, as the packet is transmitted, comprising:
(a) receiving an incremental measure of a portion of the packet;
(b) receiving a current measure;
(c) calculating a new measure, said new measure comprising the sum of said incremental measure and said current measure;
(d) determining whether said new measure exceeds a programmable threshold;
(e) if said new measure exceeds said programmable threshold:
(e') incrementing a count of the size of an IPG to follow the packet; and
(e") subtracting said programmable threshold from said new measure;
(f) storing said new measure;
(g) repeating (a) through (g), wherein said current measure comprises said stored new measure; and
(h) delaying transmission of a subsequent packet by said count of inter-packet gaps.

33. The method of claim 32, further comprising:
receiving an end of packet signal for the packet; and
forwarding said count toward an IPG module configured to apply an IPG after the packet.

34. The method of claim 33, further comprising combining said count with a default IPG to yield a total IPG to be applied by the IPG module.

35. The method of claim 33, further comprising resetting said count to an initial value in response to said end of packet signal.

36. The method of claim 35, wherein said initial value is greater than zero.

37. The method of claim 33, further comprising dynamically modifying said programmable threshold.

* * * * *